United States Patent
Lewis et al.

(10) Patent No.: US 12,410,843 B2
(45) Date of Patent: Sep. 9, 2025

(54) BINDER-FREE FRICTION LININGS, PROCESS FOR THEIR PRODUCTION AND THEIR USE

(71) Applicant: TMD Friction Services GmbH, Leverkusen (DE)

(72) Inventors: Richard Lewis, Mettmann (DE); Paulo Perin, Hamburg (DE)

(73) Assignee: TMD Friction Services GmbH, Leverkusen (DE)

( * ) Notice: Subject to any disclaimer, the term of this patent is extended or adjusted under 35 U.S.C. 154(b) by 0 days.

(21) Appl. No.: 18/299,234

(22) Filed: Apr. 12, 2023

(65) Prior Publication Data

US 2023/0243395 A1 Aug. 3, 2023

Related U.S. Application Data

(63) Continuation of application No. 16/815,489, filed on Mar. 11, 2020, now abandoned.

(30) Foreign Application Priority Data

Mar. 22, 2019 (DE) .......................... 102019107368.5

(51) Int. Cl.
*F16D 69/02* (2006.01)
*F16D 69/00* (2006.01)

(52) U.S. Cl.
CPC .......... *F16D 69/028* (2013.01); *F16D 69/026* (2013.01); *F16D 2069/002* (2013.01); *F16D 2200/0021* (2013.01); *F16D 2200/0052* (2013.01); *F16D 2200/0069* (2013.01); *F16D 2200/0078* (2013.01)

(58) Field of Classification Search
CPC ................. F16D 69/027; F16D 69/028; F16D 2069/002; F16D 2200/0069; F16D 69/026; F16D 2200/0021; F16D 2200/0052; F16D 2200/0078; B29L 2031/16
See application file for complete search history.

(56) References Cited

U.S. PATENT DOCUMENTS

| | | | |
|---|---|---|---|
| 5,576,358 A | * | 11/1996 | Lem ...................... F16D 69/026 204/157.43 |
| 10,137,609 B2 | | 11/2018 | Goldbach |
| 2004/0077245 A1 | | 4/2004 | Hartner |
| 2015/0107945 A1 | | 4/2015 | Bertoldo |
| 2017/0234390 A1 | * | 8/2017 | Kaji ...................... F16D 69/026 523/156 |

FOREIGN PATENT DOCUMENTS

| | | |
|---|---|---|
| CN | 103361031 A | 10/2013 |
| CN | 104449566 A | 3/2015 |
| CN | 104877632 A | 9/2015 |
| DE | 1425261 | 10/1968 |
| DE | 10348076 A1 | 4/2004 |
| DE | 102014105484 A1 | 10/2015 |
| EP | 3124814 A1 | 2/2017 |
| GB | 931631 | 7/1963 |
| GB | 1028762 | 5/1966 |
| JP | 2000-345140 A | 12/2000 |

OTHER PUBLICATIONS

Collins, B.T., Schneider, C.P., "Sintered-Metal Friction Materials", Modern Developments in Powder Metallurgy, pp. 160-165, Springer (Boston)(1996) ISBN 978-1-4684-7712-2.

* cited by examiner

*Primary Examiner* — David R Morris
(74) *Attorney, Agent, or Firm* — Rogowski Law LLC

(57) ABSTRACT

Expanded graphite and/or vermiculite are introduced into the friction lining mixture to eliminate or substantially reduce the amount of binder present therein. The friction lining at most contains from 2.5% by weight of binder. By omitting/reducing binder, the production is very stable and the friction linings can be easily reproduced. The process steps of hardening (including the hardening furnace) and scorching (including the necessary equipment) can be omitted when making such friction linings.

9 Claims, No Drawings

BINDER-FREE FRICTION LININGS, PROCESS FOR THEIR PRODUCTION AND THEIR USE

CROSS-REFERENCE TO RELATED APPLICATION

This application is a continuation under 35 USC § 120 of U.S. patent application Ser. No. 16/815,489, filed Mar. 11, 2020, status pending, which claims priority under 35 USC § 119 to German patent application 102019107368.5, filed Mar. 22, 2019, the contents of each of which is incorporated by reference.

BACKGROUND OF THE INVENTION

Technical Field and State of the Art

The present invention relates to friction linings for motor vehicles, preferably friction linings for disc brakes of passenger cars having no binder or a significantly reduced share of binder(s) compared to the prior art, as well as methods for their production and their use.

In automobile technology, there are four basic categories of friction linings (also called friction agents), wherein the boundaries between these categories are fluid: Semi-metallic, organic, low-metallic, and ceramic. Overall, up to 15 different materials are used in their production, and, in the case of organic friction linings, even up to 30 different materials.

Semi-metallic friction linings preferably contain 30 to 65% by weight metal, which is mixed, for example, with graphite, fillers, and binders. They are characterized by a long shelf life and a lower heat buildup during braking. A disadvantage of these linings can be a higher wear on the brake discs and the occurrence of friction squeaking.

Friction linings of the organic category (including NAOs=non-asbestos organics) are made of fibers obtained from glass, rubber, or carbon. In addition, there are fillers and heat-resistant synthetic and/or natural resins as binders. Brake pads made of these friction materials are usually softer and quieter, but also wear more quickly, cause more brake dust, and have worse friction values and thus a deteriorated braking performance, in particular when they become hot.

Low-metallic friction linings constitute a mixture of preferably 10 to 30% by weight metal and organic materials, as they are also used for the organic category. Linings made of these materials have an improved braking behavior, in particular at high vehicle speeds. In particular, the increased creation of brake dust is also disadvantageous here.

Ceramic friction linings are NAOs. They consist of ceramic fibers, fillers, and binders and may also have a small metal content. These linings may be more expensive than other friction materials with respect to the materials used and the production process; however, the wear occurring on the brake discs is lower in turn.

What is common among all of the categories of friction linings or friction materials mentioned is that they have binders, usually in the form of natural or synthetic resins, in particular in the form of phenol resins. During the pressing process of the friction material mixtures into the actual formed friction linings at increased temperature and increased pressure, the binder liquefies further, penetrates the entire friction material mixture, and carbonizes/resinifies, wherein the volatile components resulting from the pressing process escape from the pressed shape and/or from the mixture. As a result, all mixture components are connected to one other by the resinified binder. In order to design this process as completely as possible, the brake pads obtained, i.e. the support plate with a friction lining applied onto it, are treated in a hardening oven at increased temperature or resinified as completely as possible; see, for example, DE 10 2014 105 484 A1, which describes various methods for thermal treatment and/or hardening of friction linings.

However, even after this process step, non-hardened binder shares are still present in the friction lining. If the brake pads are now installed, unhardened binder shares, influenced by the high temperatures occurring during braking on the friction lining, emerge at the friction lining surface, which leads to pronounced hardening. As a result, in the case of new brake or friction linings, the braking performance in the break-in phase is significantly reduced, which is called "green fading." In order to circumvent this problem, the friction linings located on the support plate are subjected to a so-called "scorching" prior to installation. During this process, the brake pads are heated for a defined period of time, e.g. with a gas flame or IR radiation, wherein temperatures of approx. 400° C. to approx. 700° C. or more are generated on the friction lining surface. As a result, the unhardened binder shares are expelled, and the brake pad is "broken in" during the production operation.

For the special case of production of ceramic friction linings, the omission of binders during the production is proposed in EP 3 124 814 A1. These friction linings contain no metals or metallic components, and the so-called "green body" that is initially obtained must be subjected to a so-called "reactive melt infiltration," in which liquid silicone or silicone alloys react with the carbon contained in the green body into (ceramic) silicone carbide (SiC).

Furthermore, binder-free friction linings are described in the prior art.

DE 1 425 261 A discloses a binder-free friction lining that is produced by pressing and sintering from metal fibers and fillers. The friction material is meant to be used in couplings, brakes, and transmissions.

GB 931631 A relates to a friction lining for an aircraft brake, which is similarly produced by a sintering process from metal fibers and fillers.

DE103 48 076 A1 similarly concerns a friction lining that can be produced without binders and consists of a sintered fiber compound, preferably made of polyamide fibers.

US 2015/0107945 A1 discloses a friction lining for a vehicle brake that is produced on a fiber basis and has a binder share of 2 to 30% by volume.

The objective of the present invention was therefore the provision of additional friction lining mixtures or friction linings that can be manufactured as cost effectively as possible, with simultaneous high quality and high property profile of the resulting friction linings, including a corresponding production process in which the disadvantages known from the prior art and previously necessary process steps can be avoided to the greatest extent possible.

SUMMARY OF THE INVENTION

The problem is solved according to the invention by means of a metal-containing friction lining containing no binder or only a very small share of binders. The percentage of binders is preferably a maximum of 2.5% by weight (here and below, all weight % information is based upon the finished friction material mixture from which the actual friction lining is produced), further preferably up to a maximum of 1% by weight, in particular up to a maximum of 0.9% by weight and particularly preferably 0% by weight.

The friction lining mixture used for producing a friction lining for a brake for a motor vehicle, such as a disc brake, is binder-free, or only contains binder at a maximum of 2.5% by weight relative to the finished friction lining mixture, and further contains expanded graphite and/or expanded vermiculite, preferably in amounts from 5-26% by weight. The friction lining mixture also may contain steel fibers at 30-65% by weight. When present, the graphite used has a particle size in the range of 0.25-1.5 mm.

A method for producing a friction lining comprises preparing a mixture of expanded graphite and/or expanded vermiculite, preferably in amounts from 5-26% by weight, optionally with steel fibers at 30-65% by weight, based upon the weight of the finished friction material mixture from which the actual friction lining is produced. The mixture preferably is binder-free, or at most contains binder in an amount at a maximum of 2.5% by weight relative to the finished friction lining mixture. When present, the graphite used has a particle size in the range of 0.25-1.5 mm. The friction lining mixture is pressed into a suitable mold and retained in such mold at increased pressure and increased temperature. When forming the friction lining from the mixture, the process steps of hardening and scorching the friction lining are omitted.

DETAILED DESCRIPTION OF THE INVENTION

The problem is solved according to the invention by means of a metal-containing friction lining containing no binder or only a very small share of binders. The percentage of binders is preferably a maximum of 2.5% by weight (here and below, all weight % information is based upon the finished friction material mixture from which the actual friction lining is produced), further preferably up to a maximum of 1% by weight, in particular up to a maximum of 0.9% by weight, and particularly preferably 0% by weight. Particularly suitable are organic or inorganic binders that harden during hot pressing in the range between 100° C. and 200° C. The binders that are typical for friction linings, such as phenol resins, novolaks (or novolacs) as condensation products from formaldehyde and excess phenol, polyimides, cyanate ester, phthalonitrile resins, and silicone resin can be used as binders, wherein the phenol novolak resins are preferred according to the invention. Binder mixtures can also be used as binders.

The friction linings according to the invention are preferably semi-metallic friction linings with metal shares of 30 to 65% by weight, wherein friction lining mixtures/friction linings from the so-called low-metallic range (metal share 10 to 30% by weight) are covered by the invention.

For the purposes of the present invention, the term "metal" or "metallic" covers all metals or metal alloys in all of their forms occurring in semi- or low-metallic friction materials, such as fibers, wool, etc.

Fibers are the preferred form, in particular for the metals or metal alloys. These fibers should not be too fine or too short, because otherwise the mechanical stability of the respective friction lining could suffer. Too long fibers or wool can cause problems in the mixing of the starting components and their distribution in the resulting friction material mixture. The fibers preferably have an essentially rectangular cross section and are therefore preferably not drawn out in design. It is therefore preferable to choose the scraped fibers commonly used in the field of brake production. The dimensions of such fibers, which are commercially available, are known to the prior art and to a person skilled in the art.

With respect to metals, the friction linings according to the invention preferably contain iron or steel, in particular stainless steel, aluminum, or brass. Copper would also be suitable, but is not often used due to existing environmental regulations. Particularly suitable are iron, steel, and stainless steel, which are preferably provided as fibers having the parameters/dimensions described above. Various metals can also be used simultaneously here.

The preferred share of metals in the finished friction lining mixture from which the friction lining is produced is preferably at least 30% by weight, in particular at least 35% by weight, and particularly preferably at least 40% by weight. The maximum share of metal is 65% by weight.

The metal fibers present in the friction material, in particular steel or stainless steel fibers, are usually sufficient to provide the friction lining resulting from the pressing of the friction material mixture with the necessary mechanical stability and the necessary braking properties.

In order to further improve the stability and the property profile of the friction linings according to the invention, it has proven to be advantageous to use, in addition to the components that ensure a good property profile mechanically, at least one additional component that additionally strengthens the cohesion of the friction lining components and thus of the friction lining itself in a not purely mechanical manner. Expanded graphite and expanded vermiculite have proven to be particularly suitable here. Electrode graphite is not suitable for the purposes of the invention. Expanded graphite or exfoliated graphite are particularly suitable. Graphite is constructed from graphite layers, between which only very weak binding forces prevail, whereby its good sliding and lubrication properties can be explained. Expanded graphite is formed by the storage of molecules between these graphite layers. Through the storage of acids, usually sulfuric acid, graphite is converted into exfoliated graphite. Graphite is preferably used with a particle size of approximately 0.25 mm to approximately 1.5 mm, and further preferably from approximately 0.5 mm to approximately 1 mm.

Vermiculite is a layer silicate belonging to the clay minerals and forming flaky crystals. Exfoliated mica or expanded vermiculite are formed by the processing of mica schist. Here, raw vermiculite is thermally expanded, whereby the chemically bound crystal water between the layers is expelled and the volume is increased by up to 35 times the starting value. Expanded vermiculite or exfoliated vermiculite is suitable according to the invention.

All materials described are commercially available.

In the event of a complete or extensive omission of binders (such as phenol resins, novolaks (novolacs)) during the friction lining production, the use of the metal fibers preferred according to the invention (in particular steel or stainless steel fibers) and without expanded graphite or expanded vermiculite can be sufficient to obtain friction linings with a sufficient or good property profile. By comparison, the omission of metal fibers does not lead to the desired result. The use of the specified combination of metal fibers (also in the form of different types simultaneously) and expanded graphite and/or expanded vermiculite (also in the form of different types simultaneously) is preferred.

In general, the metal fibers are used at 30-65% by weight (in accordance with the semi-metallic friction lining category described above), and the second material category (which is not effective due to mechanical solidification, expanded graphite, and/or expanded vermiculite alone) is used at 5-26% by weight. The % by weight information is based upon the finished friction lining mixture to be pressed.

The production of the friction linings according to the invention takes place according to the methods well-known to the prior art and to a person skilled in the art by mixing the starting components and pressing the friction lining mixture at increased pressure and increased temperature. Preferred parameters in this respect are, for example, temperatures of 135-240° C. at a pressure of 45-200 MPa for a duration (pressing time) of 50-300 seconds.

In principle, the process for producing friction linings according to the invention can also be described as follows:

Assuming a typical semi-metallic friction lining composition such as:

| Component | Share in % by weight |
| --- | --- |
| Graphite | 26 |
| Steel fiber | 53.9 |
| Phenol resin | 0.9 |
| Petroleum coke | 8.8 |
| Calcium fluoride | 2.6 |
| Silicon carbide | 2.6 |
| Magnesium oxide | 5.2 | the components steel fibers and graphite, and possibly also the binder (here, phenol resin), are mathematically removed from the calculation, and the remaining composition (here, 19.2% by weight remaining) is included in a friction lining mixture according to the invention at, for example, 60% by weight. The missing 40% by weight then consists of metal fibers according to the invention, expanded graphite and/or expanded vermiculite, and possible binder, if no absolutely binder-free friction lining composition is desired. According to the invention, the binder share is a maximum of 2.5% by weight. The remaining composition can be included at more or less than 60% by weight in the friction lining mixture according to the invention. It contains the typical components of the friction lining categories described above.

The binders that, according to the invention, are preferably not present or only in a very small share in the friction linings/friction lining mixtures are the binders commonly used in the friction lining production of the prior art. Examples of this are given above. These are usually binders that are or become liquid under the process conditions of the friction lining production and then act as chemical adhesives. For the purposes of the present invention, expanded graphite and expanded vermiculite are not considered to be binders, because they are not self-adhesive but realize a mechanical binding under pressure in the friction lining composition according to the invention.

Due to the complete or at least extensive omission of binders (classic or liquid binders) according to the invention, the production of high-performance friction linings is significantly simplified and made less expensive. Due to the omission of the binder, the production is very stable and the friction linings can be easily reproduced. In particular, it should be pointed out that the process steps of hardening (including the hardening furnace) and scorching (including the necessary equipment) can be omitted for such friction linings.

Additional objectives, advantages, features and application possibilities of the present invention can be gleaned from the description herein of embodiments. In this context, all of the described features, either on their own or in any meaningful combination, constitute the subject matter of the present invention, also irrespective of their compilation in the claims or in the claims to which they refer back.

The invention claimed is:

1. A method for producing a friction lining, comprising:
preparing a friction lining mixture that contains from 10% to 65% by weight of steel fibers, stainless steel fibers and/or iron fibers, from 5% to 26% by weight of expanded graphite particles with a particle size in a range of from 0.25 mm to 1.5 mm and/or expanded vermiculite particles, and a binder in an amount of from 0% to 2.5% by weight relative to the friction lining mixture, wherein the amount of copper is 0% by weight;
compressing the friction lining mixture in a heated mold at a temperature in the range of from 135° C. to 240° C. for up to 300 seconds to cohesively bind together the fibers with the expanded graphite and or expanded vermiculite in the friction lining, and, if the binder is present, to self-adhesively cure the binder; and
wherein the compressed friction lining mixture is not hardened or scorched.

2. The method according to claim 1, wherein the friction lining is compressed in the heated mold at a pressure of from 45 MPa to 200 MPa for a pressing time duration of from 50 seconds to 300 seconds.

3. The method according to claim 1, wherein the expanded graphite has a particle size in a range of from 0.5 mm to 1 mm.

4. The method according to claim 1, wherein the friction lining mixture is binder-free.

5. A friction lining produced by the method of claim 1.

6. A friction lining produced by the method of claim 4.

7. A method for producing a friction lining, comprising:
preparing a friction lining mixture that consists essentially of from 10% to 65% by weight of steel fibers, stainless steel fibers and/or iron fibers, from 5% to 26% by weight of expanded graphite particles with a particle size in a range of from 0.5 mm to 1.5 mm, and a binder in an amount of from 0% to 2.5% by weight relative to the friction lining mixture, wherein the amount of copper is 0% by weight; and
compressing the friction lining mixture in a heated mold at a pressure of from 45 MPa to 200 MPa, at a temperature in the range of from 135° C. to 240° C., and for a pressing time duration of from 50 seconds to 300 seconds to cohesively bind together the fibers with the expanded graphite in the friction lining, and, if the binder is present, to self-adhesively cure the binder; and
wherein the compressed friction lining mixture is not hardened.

8. The method of claim 7, wherein the friction lining mixture is binder-free.

9. A friction lining produced by the method of claim 7.

* * * * *